Aug. 24, 1926.
C. L. FORTIER
1,597,349
CONTROL SYSTEM FOR TEMPERATURE, HUMIDITY, AND THE LIKE
Filed May 23, 1924    2 Sheets-Sheet 2
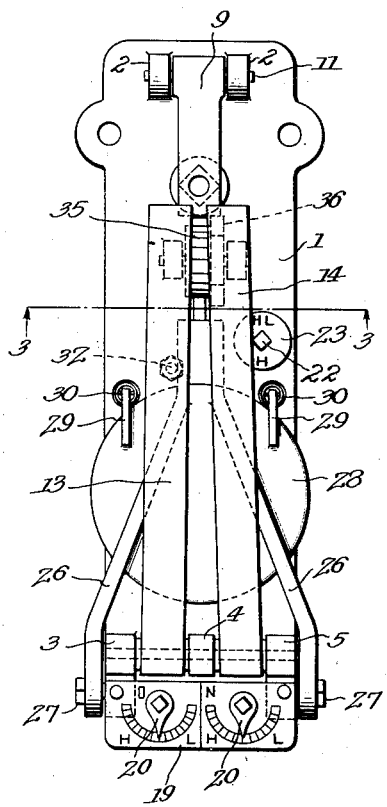
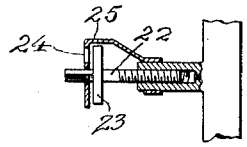
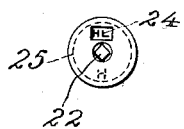
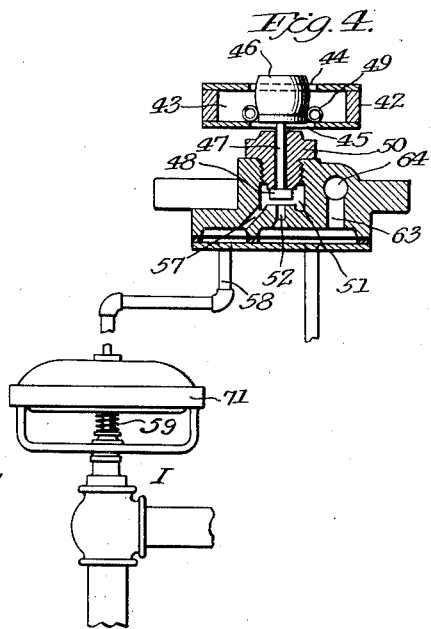
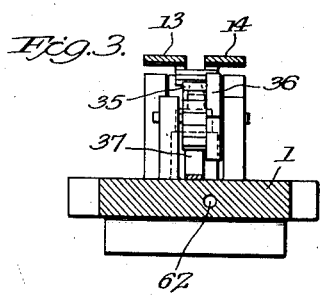
Inventor,
Charles L. Fortier,
By Dodge & Sons,
Attorneys Patented Aug. 24, 1926.

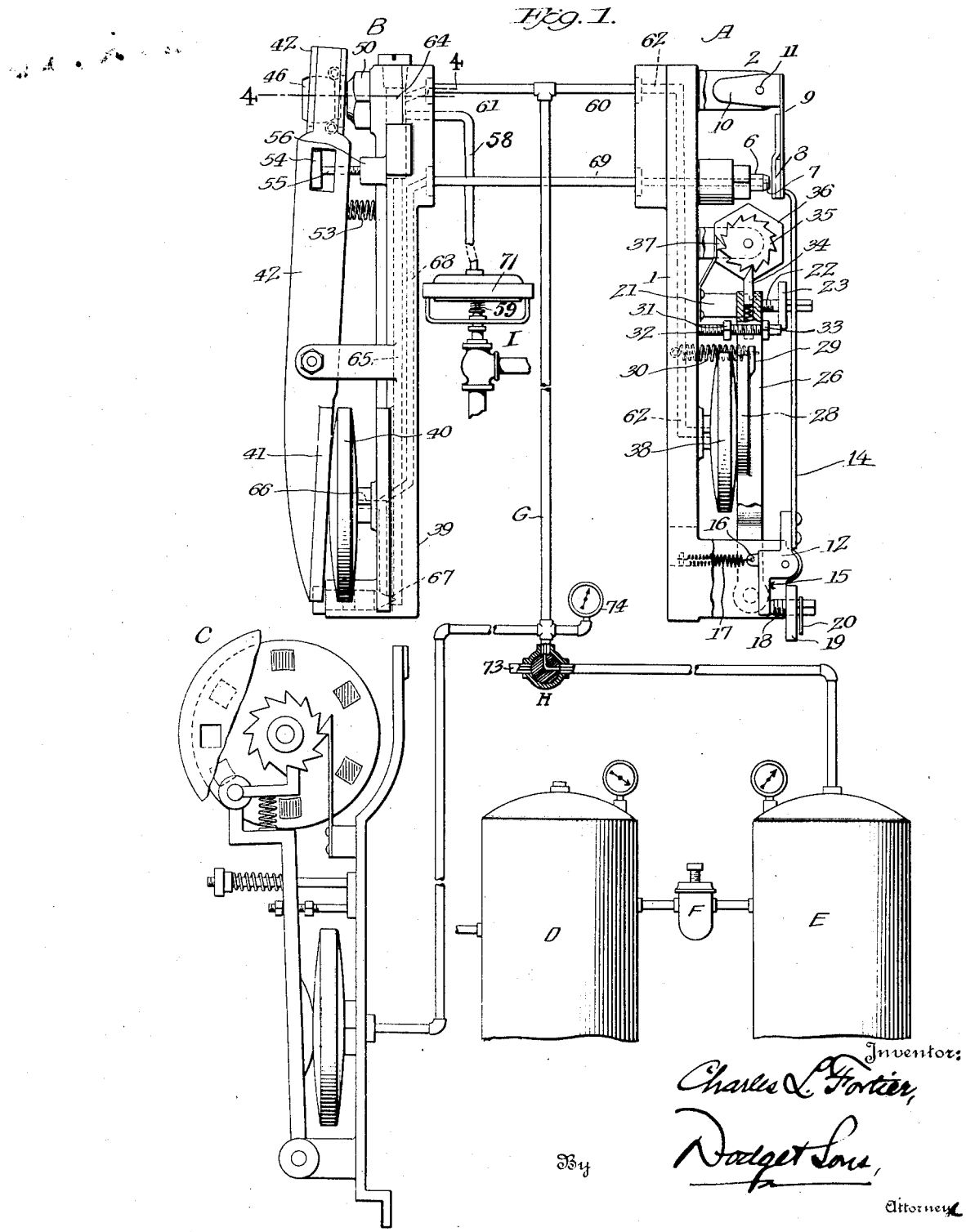

1,597,349

UNITED STATES PATENT OFFICE.

CHARLES L. FORTIER, OF MILWAUKEE, WISCONSIN, ASSIGNOR TO JOHNSON SERVICE COMPANY, OF MILWAUKEE, WISCONSIN, A CORPORATION OF WISCONSIN.

CONTROL SYSTEM FOR TEMPERATURE, HUMIDITY, AND THE LIKE.

Application filed May 23, 1924. Serial No. 715,449.

REISSUED

This invention has reference to control systems of the compressed-air type, employing an element or device responsive to atmospheric changes, here described in connection with temperature control but applicable also to the control of humidity. The purpose of the invention is to afford a simple mode and efficient means of controlling from a central point, and if desired, from a considerable distance, the action of thermostats or analogous responsive elements or devices in selected rooms or portions of a building, so that heat, moisture, or the like may be supplied to, varied in, or cut off from such rooms at will while held at normal in others, through automatic control.

A temperature of 70 degrees Fahrenheit is now generally adopted as the normal or usual daytime temperature suitable for rooms in dwellings, offices, hotels, and the like, and it is customary to carry in the air pipe or conduit of pneumatic temperature-control systems a pressure of 15 pounds per square inch. These may hence be assumed in the following description as normal temperature and pressure figures, though any others desired may be adopted in practice, without in any manner affecting the principle and mode of operation herein set forth.

In buildings of a public or quasi-public character, as schoolhouses, large office buildings, hotels, etc., it is customary to cut off or to lower the temperature after the occupants leave for the day, or during that portion of the day or night when a relatively low temperature is usually desired. This is done to economize fuel, and for hygienic reasons. It is of course desirable to be able to control from a central point the action of thermostats in those rooms which are to be temporarily taken out of automatic control, or in which other than normal temperature is to be for a time maintained. This is accomplished through manipulation of the air pressure in the main air pipe of the control system, and consequent operation of devices which throw the thermostatic control devices out of action, or set them for operation at other than the adopted normal temperature and later restore them to normal operation, such manipulation being effected preferably at a point near the air tank or source.

The invention is susceptible of embodiment in somewhat varied form, a simple and preferred type being illustrated in the accompanying drawings, in which:

Figure 1 is a side elevation of apparatus embodying my invention, the air tanks being shown in greatly reduced size because of lack of space to show them in proper proportion to other parts;

Fig. 2, a face view of the thermostatic selector constituting one element of the apparatus and serving, under manipulation of the air pressure in the air pipe or conduit, to cause the heat to be maintained at normal, at subnormal, or entirely cut off, as desired;

Fig. 3, a horizontal section on the line 3—3 of Fig. 2, looking upward;

Fig. 4, a horizontal section on the line 4—4 of Fig. 1, looking downward;

Figs. 5 and 6, detail views of the stop and indicator for holding one thermostatic bar out of action.

The present invention is designed to permit the apparatus to be quickly set to cause the instruments in different rooms to bring about therein the temperature desired, either the normal daytime temperature, a lowered temperature, or a complete cutting off of the heat. Preliminary to such change, the selectors in individual rooms are set so as to be affected or unaffected by the control valve at the central station or point of control. This may be done by the janitor of the building or by occupants of the rooms. Ordinarily, however, it will be done by the janitor or person in charge of the heating of the building, such setting being independent of the usual setting of the thermostats for a desired temperature.

In the drawings, A indicates a thermostatic selector; B a relay; C an indicator for showing at the central control point the adjustment of the selector; D and E air tanks; F a reducing valve; G the main air pipe; and H the three-way valve and vent by which the pressure in the pipe G is lowered and restored to normal at will.

In practice, it is preferred to use two air tanks, as D and E, the first (D) connected with a pump which forces air into said tank until a predetermined pressure, usually 30 pounds, is established therein. The second tank E is connected with the first by a pipe or cross connection containing a reducing valve F by which the pressure in the tank E is maintained at a lower pressure, usually 15 pounds, which is the normal pressure deemed desirable for the main air pipe extending to the various instruments in the system or to the branches connected therewith. Upon a lowering of the pressure in tank D the air pump automatically goes into action so that a constant pressure of 30 pounds is maintained therein, and a proper supply is always available for tank E.

It is of course to be understood that any desired number of selectors and relays may be employed in the building, all connected by suitable branch pipes with the main air pipe G.

The selector A, designed to cause a night and day or only a day temperature to be given the room or space under its control, comprises a main frame or base 1 having at its upper end projecting lugs 2, and at its lower end similar projecting arms 3, 4 and 5, and near its upper end a projecting nozzle or nipple 6 provided with a vent or leak-port 7 opening at its outer end. Facing the leak-port 7 is a valve or pad 8 carried by a pendulous arm or "lid" 9 secured to or formed with an unbalanced or weighted block 10 carried by a pivot-pin 11 passing through the block 10 and held at its ends in the lugs 2, 2. The pivot 11 is located near the outer end of block 10 so that its inner end acts as a weight tending to tip the block on its pivot, and throw the pad-carrying arm 9 outward away from the nipple 6 and its leak-port 7, and thus to open said port.

Attached to separate saddles 12 pivotally mounted between lugs 3 and 4 and 4 and 5, are two thermostatic strips 13 and 14, each composed preferably of a strip of iron or steel and a strip of brass, soldered, sweated, riveted or otherwise united face to face, the strip having the higher co-efficient of expansion constituting the outer face in both instances. It is of course understood that any two suitable substances having different co-efficients of expansion may be thus combined with a view to securing a warping or flexure of the thermostatic strip in response to rise or fall of temperature in the surroundng medium, various such couples being well-known and common in the art. The upper extremities of the strips 13 and 14 both overlie or stand in front of the pendulous pad-carrying arm 9, so that either strip on bending or warping inward toward the main frame 1 upon a rise of temperature, will press the arm 9 and its pad or valve 8 toward the nipple and tend to seal the leak-port thereof. Conversely, on a lowering of temperature, said strips will warp or bend outward and leave the pendulous arm free to be swung outward by its weighted carrying block 10.

Each saddle 12 is formed with a depending arm 15 and with a perforated ear or lug 16 above the horizontal plane of the saddle pivot, to which lug is attached one end of a spring 17, the other end of which is attached to the frame or base 1. The spring 17 tends constantly to draw inward the strip 13 or 14, and to cause the lower arm 15 of the saddle to bear against an adjusting screw 18 threaded in a graduated dial-plate 19 carried by the arms 3, 4 and 5. Each screw 18 is provided with a pointer or indicator 20 movable over the graduations of its dial, the graduations indicating different degrees of temperature. Each saddle is thus held normally in fixed position with its lower arm held against the adjusting screw 18 by its spring 17, but as the screw is turned inward, the saddle will be rocked on its pivot and the thermostatic strip 13 or 14 will be swung outward or away from the pendulous arm 9, hence will require a greater rise of temperature to cause it to press the pad 8 against nipple 6 and thus to seal the leak-port. Conversely, if the screw 18 be backed or turned to move outward, depending arm 15 of the saddle will be caused to follow and bear against the receding end of the screw, the saddle will rock upon its pivot, and the strip will have its upper extremity brought inward toward the nipple 6, and a lesser flexure will enable it to press the pad 8 into closing relation with the nipple and its leak-port. The spring 17 serves the further purpose of permitting the saddle to rock slightly outward in the event that the rise of temperature be so great as to cause a very marked inward bending of the strip carried by it, thus preventing the stressing of said strip beyond its elastic limit, which of course would interfere with its proper functioning thereafter.

Projecting from the front or outer face of base-plate 1 is a tubular post 21 tapped to receive a screw-stem 22 carrying a disk 23 and having a polygonal outer end to receive a key, wrench or other implement by which to turn it. The disk 23 bears, preferably at diametrically opposite points on its face, the letters HL and the letter H, or equivalent indicia, one or the other of which will be displayed at a window or opening 24 of a shield or guard 25 overlying the front or outer face of the disk, as the disk is turned to bring one or the other marking opposite said window. Any convenient stop may be provided to limit the rotation of the screw, a half rotation being permitted in practice, and the pitch of the screw being made such that a half rotation in one and the other direction will give one or the other working adjustment of the stop. The screw stem 22 lies just outside the outer boundary of the strip 14, the disk 23 projecting into the path of movement of said strip and forming a stop to limit its approach to the base or frame 1 or to the pad-carrying arm or lid 9.

26 indicates a swinging frame the lower end of which is carried on pivot-screws 27 entering holes in the sides of the base-plate or frame 1, and tapped to receive set screws. This frame carries a disk or "saucer" 28 provided with stems or studs 29 to each of which is attached one end of a spring 30, the other end of which is attached to the base-plate or frame 1. Each of these springs is stressed or tensioned sufficiently to hold the upper or swinging end of the frame 26 normally against a stop 31 in the form of a nut carried by a threaded rod or stem 32 projecting outward from the face of the base-plate. A second stop nut 33 is screwed upon the rod or stem 32 on the outer side of the frame 26, so as to limit the outward swing or throw of said frame. By adjustment of the nuts the amplitude of the swing may be determined.

The upper extremity of the frame 26 is formed with a seat or socket to receive a slidable pawl or dog 34 having a beveled upper end, and pressed upwardly or outwardly by a light spiral spring, as illustrated in Figure 1.

Directly above and in plane with the path of the pawl 34 as it is carried back and forth by the swinging frame 26, is a ratchet-wheel 35, here represented as provided with twelve teeth of the common saw-tooth form, the radial faces of which are opposed to the upright face of the pawl or dog 34. This ratchet-wheel is made integral with or firmly joined or connected to a flat disk 36, here shown of hexagonal form, hence presenting six flat sides meeting in six obtuse angles. The ratchet-wheel 35 and disk 36 are mounted upon a common pivot-pin or axle extending between two brackets or studs projecting from the face of base 1. The radii of disk 36 extending through the points or angles are such that when one of said points or angles is brought to a horizontal line or perpendicular to the frame or base 1 and to thermostatic strip 14, it will bear against the inner face thereof, thus pressing the strip a short distance away from the pendulous arm or carrier 9 and holding it in such retracted position. At such time the spring 17 yields sufficiently to prevent any overstressing or permanent distortion of the compound strip.

As there are twelve teeth in the ratchet, and as the disk 36 has six points or angles and an equal number of intermediate flat faces, it will be seen that successive movements of the wheel and disk, effected by the swing of frame 26 and pawl 34, will bring alternately a point and a flat face opposite the inner face of the strip 14. The radii of the flat faces of the disk, taken at their mid-length, are enough shorter than the radii extending through the points or angles to leave a material space between such flat face and the strip 14 when such face is parallel with the strip, as in Fig. 1. The strip 14 is then free to act upon the pendulous arm 9 in response to temperature changes.

To prevent the backward movement of the ratchet-wheel 35 or overthrow in the direction of rotation, there is provided a spring-supported locking pawl or dog 37, conveniently attached to the frame or base 1 in the position shown in Fig. 1.

Carried by the base-plate 1 and facing the saucer or disk 28 of frame 26, is an expansion device or chamber 38, one or both walls of which is or are adapted to be flexed or bulged outward when a fluid under pressure is introduced into said chamber, it being usual to provide one or both walls of said chamber with corrugations arranged in a generally concentric relation.

The relay B shown in Figs. 1 and 2 is a positive-acting relay, comprising a base 39 carrying an expansible element 40 of the same construction as chamber 38 of the selector A, to which element is opposed a disk or "saucer" 41 of a swinging frame 42 fulcrumed at a point approximately midway between its ends, and carrying at its upper end a quick-throw valve device of the construction best shown in Fig. 4; that is to say, the upper end of frame 42 is in the form of a box or shell 43, with alined circular openings 44 and 45 in its front and rear walls to permit it to swing over and clear of a head 46 of generally spherical form carried by the stem 47 of a three-way valve 48, which in its different positions seals and unseals a passage for air to the motor of a heat-control valve.

Encircling the spherical head 46 is a contractile spring 49, conveniently made of a helical wire coil with its opposite ends brought together and connected in any usual manner. Owing to the fact that spring 49 is stressed or tensioned slightly before being passed about the spherical head 46, it will because of its tendency to contract, ride toward one or the other end of said head as soon as it is carried by the swinging of frame 42 past the medial or equatorial zone of head 46. As soon as the spring 49 passes such medial zone and comes in contact with the opposite wall of shell 43, it will act to move the valve stem and valve in a direction opposite to that in which the frame 42 and with it the annular spring 49 is moving or has just moved. Consequently, when frame 42 swings inward to the position indicated in Figs. 1 and 4, valve 48 will be caused to move quickly outward, and to seat itself against the inner end of the nipple 50 through which the valve stem 47 moves. Stem 47 fits loosely within said nipple, hence when the valve 48 is out of contact with the inner end of the nipple, the passage or opening through which the stem 47 plays affords a vent or leak-port for the valve chamber 51, venting the same to the atmosphere. When the frame 42 swings outward, it first carries the annular spring 49 outward with it until the spring passes the medial zone of the spherical head 46, whereupon the spring acts to move the valve-head, stem, and valve inward and to seat it upon mouth or port 52, thereby sealing said port and venting chamber 51 through the space around the stem 47, as just mentioned.

Between the upper portion of frame 42 and the front or outer face of base 39 is interposed a spring 53 tending constantly to press the upper end of said frame outward, and to maintain it in such outward position when the leak-port 7 of nipple 6 is unsealed. When, however, said nipple is sealed, pressure builds up in the chamber 40 of relay B, causing its front wall to expand and to press out the disk 41 of frame 42, thereby throwing the upper end of said frame inward toward the base of frame 39, such inward movement being limited by a stop 54 having a threaded stem 55 entering a tapped seat in a stud or projection 56 formed on the front of base 39.

As above explained, the inward movement of the upper end of frame 42 causes, through the action of the contractile spring 49, an outward movement of valve 48 and unsealing of the port 52, permitting air under pressure to pass by said port, chamber 51, passageway 57 and pipe 58 to the air chamber of a self-opening heat-control valve I, where the pressure of the air overcomes the opening tendency of the spring 59 of valve I and seats the valve, thus cutting off the heat in the well-known manner.

The main air pipe G, which as stated communicates with air tank E and carries a pressure of 15 pounds ordinarily, communicates by branches 60 and 61, respectively, with the selector A and the relay B. In the case of the selector, pipe G communicates by a passage 62 with the interior of expansible chamber 38, and serves when full pressure is afforded, to press frame 26 outward to the position shown in Fig. 1 and to hold it in such position, the pawl 34 carried by said frame engaging in its outward movement a tooth of ratchet-wheel 35, and rotating said wheel and consequently the disk 36, the space of one tooth or one-twelfth of a revolution. Upon lowering of the pressure in said chamber 38 and the collapse of its outer wall or diaphragm, frame 26 is drawn inward by contraction of springs 30 to a position where its pawl 34, riding backward over the inclined face of a succeeding tooth, will engage the radial face thereof preparatory to a re-inflation of expansible chamber 38, when frame 26 will be thrown outward and the ratchet-wheel advanced another tooth. In this way each inflation of the expansion chamber causes a forward movement to the extent of one tooth, and each deflation permits a return movement of the actuating pawl 34 for engagement with a succeeding tooth, hence a complete vibration or swing of the frame to engaging position and then outward, is essential to each step-by-step advance or rotation of the ratchet and disk.

By branch pipe 61 communication is had with the relay B, the air passages and ports of which will be explained in connection with Figs. 1 and 4. Air is admitted simultaneously by port 52 to the valve chamber 51, and by port 63 to a filtering chamber 64 filled with wool or other dry filtering material, which takes out all dust or solid matters carried by the air current which might otherwise clog the leak-ports and other minute openings. Passing this filter chamber the air goes by passage 65 and connected passage 66, both shown in dotted lines in Fig. 1, to the interior of expansible chamber 40, its flow being regulated by a needle valve 67 capable of very accurate adjustment by turning its threaded body in a correspondingly threaded seat. The needle valve 67 reduces the flow of air to the expansible chamber 40 to a point below the venting capacity of leak-port 7 of selector A, with which leak-port the valve communicates by a passage 68 and pipe 69, as shown in Fig. 1. The passage 68 connects with passage 66 where the latter enters the chamber 40.

The action of the selector A and relay B, constructed and arranged as above described, is as follows: The strips 13 and 14 of the selector being arranged so that a rise in temperature will cause them to bend or warp inward, as above explained, they will engage and move pendulous arm 9 and carry the valve-pad 8 toward the mouth of th leak-port 7 of nipple 6. Strip 14 being adjusted for low temperature, will close said leak-port, and such closure will be followed by inflation of expansible chamber 40 of the relay, causing frame 42 to swing inward at its upper end, thereby causing an outward movement of the head 46 and stem 47 of valve 48, unseating said valve from the mouth of inlet port 52 and seating it against the inner end of nipple 50, which latter is thus closed against escape of air from the valve chamber 51. This adjustment of three-way valve 48 opens passage 57, and permits air to pass by pipe 58 to the pneumatic motor 71 of main heat-control valve I, resulting in the closure of said valve and the shutting off of heat from the room or apartment in which the selector is located. The temperature in said room or apartment consequently falls, causing the strip 13 to flex outward away from pendulous arm 9, and leaving control thereof entirely to the other strip 14 which, as explained, will seal the leak-port 7 and maintain it sealed at a low temperature, and thus shut off completely or partially the flow of the heating medium past heat-control valve I.

This condition will continue so long as the parts are set or adjusted as above stated. If it be desired to change the adjustment of the selector to beget a higher or normal temperature in the room or apartment in which said instrument is located, the air pressure in the main air pipe G is lowered so as to reduce the pressure therein from the normal 15 pounds to, say, 8 pounds. Thereupon the front wall or diaphragm of expansible chamber 38 of the selector will collapse, and the swinging frame 26 will be drawn inward by the springs 30, thus carrying pawl 34 backward over a tooth of the ratchet-wheel 35 and causing said pawl to engage with the radial face thereof. Prompt restoration of air pressure to normal causes inflation of said expansible chamber 38, the bulging front wall or diaphragm of which bearing against the disk 28 of frame 26 swings the latter and its pawl 34 outward, causing the ratchet-wheel to be rotated one tooth and the hexagonal disk 36 to be similarly turned a distance sufficient to bring one of its points or angles into contact with the strip 14, forcing its free end out of contact with arm 9. The strip 13 having been bent or flexed outward away from the arm 9 by the lowered temperature, leaves said arm free to be lifted or swung from the nipple 6, and the valve or pad 8 to be withdrawn from the leak-port 7 by the weighted block or arm 10, thus unsealing the leak-port and permitting collapse of expansible chamber 40 of the relay and consequent inward movement of the three-way valve 48 and venting of motor 71 of main air valve I, and the opening of said valve through the action of its unseating spring 59.

Change of temperature in the room or apartment in which the selector is located will thus be placed under control of strip 13, and strip 14 though flexed or warped toward the arm 9 by rise of temperature, is held from engagement therewith by a point of the hexagonal disk 36, so that when it is again put in control of arm 9 by another movement or step advance of the ratchet-wheel 35, it is in condition to press upon said arm, seal the leak-port 7, and bring about a lowering of temperature in the room or apartment.

To effect the quick lowering and restoration of air pressure in pipe G and prevent waste of air from tank E, there is provided the three-way valve H having vent port 73. This valve is provided with two radial passages in 90 degree relation, which normally connect the tank E with pipe G, but which when the valve is turned through 90 degrees in the proper direction, shuts off communication between said tank and pipe G and opens communication between said pipe and restricted vent 73, thus permitting air to flow out of the pipe G and its branches and to lower the pressure therein to the desired extent.

Valve H is preferably located close to the tank E, and a pressure gage 74 communicating with the pipe G at a point beyond said valve, or between pipe G and tank E, and where it may be readily seen and read by the attendant operating the valve H, enables such attendant to note the exact pressure in pipe G. As soon as the pressure is sufficiently lowered in said pipe, the valve H is turned back to normal position, closing the vent 73 and causing a prompt restoration of the full 15 pound pressure in pipe G and its branches. The backward or inward movement of the pawl 34 to engage a fresh tooth of ratchet 35 is thus followed in a very brief time by the outward movement of said pawl, with the resulting advance or turning movement of the ratchet wheel and hexagonal disk.

In this way the setting of the selector A may be quickly changed by the attendant from a central point or station. This change will take place in all the rooms in which are located selectors and relays of the above described construction and arrangement, and changes from high to low temperature control may be alternated as frequently as desired, the total period required for change either way being very short.

For the purpose of enabling the attendant or person in charge of the heating plant to ascertain the adjustment last made through manipulation of valve H, an indicator C is provided. This is described in detail in a co-pending application, Serial No. 708,796, and such description need not be repeated here. It is sufficient to say this indicator employs actuating mechanism analogous to that of the selector above described, in that it has a swinging frame carrying a pawl which engages successively different teeth of a ratchet wheel secured to a shaft or arbor which carries also a disk provided with darkened spaces and intermediate light spaces which alternately show at a window of a guard or cover placed in front of the disk. The swinging frame has a restricted movement, is pressed inward or into ratchet-engaging position by a spring, and is moved outward against the resistance of said spring through the action of an expansible chamber, the outer wall of which presses against the swinging frame to move it outward, the expansible chamber being in communication with the air pipe G.

Obviously, details of construction may be varied so long as they are kept within the range of known mechanical equivalents.

It is also to be understood that though a ratchet-wheel having twelve teeth, and a disk of hexagonal form or having six flat faces and six points or angles, are shown and described, the number may be varied so long as the aggregate of flattened faces and projecting points or angles equals the number of teeth of the ratchet-wheel, and the number in each case is even.

The temperature at which the strip 14 shall function to seal the leak-port 7 and cause the heat to be shut off will be determined by the setting of the screw 18 and indicator 20 controlling the initial adjustment of saddle 12 and its strip 14. Strip 13 is similarly adjusted.

Though I have here shown the selector and the relay as separate instruments, and may so use them where desirable, they may and usually will be placed upon a common base or support, and if desired, under a single cover.

The disk 36 may take the form of a star wheel, or have a sinusoidal periphery, the alternate elevations and depressions serving the same purpose as the flat faces and angles of the hexagon or like geometric figure. Similarly, the stop 23 may be varied in form, provided it be capable of adjustment to arrest strip 14 or to let said strip bend inward far enough to press the pad or valve 8 to its seat on the nipple 6, and thus to seal the leak-port 7.

Relays of the general character of that illustrated and above described are in extensive use, and vary in details of construction according to the particular place in which they are to be used, and the special functions to be performed. That is to say, the leverage may be of the first, second or third order, or the relay may be of the quick-acting or the gradual-acting type, serving in the latter case to impart motion to an element of the temperature control system requiring impositive movement. Mere reversal of parts of the devices here described for use in connection with self-closing heat-control valves, or with other devices reversely arranged as related to those here shown, may be made without departing from the spirit of this invention. Thus instead of arranging the thermostatic strips 13 and 14 to move the pad or valve 8 in a direction to seal nipple 6 on rise of temperature, as illustrated, they may be arranged to vent said nipple on rise of temperature in accordance with the showing of Patent No. 1,099,923 granted to Carl F. Johnson, June 16, 1914. The claims are to be read with this understanding. It is hence to be understood that the selector may be used wherever it is desirable to cause one or another of two independent thermostatic elements to seal or unseal, or to impart motion to, a component of the temperature-control system, and that it is not necessarily used with a secondary valve of the particular type or having the special function of valve 48.

It is obvious that by employing different substances for the strips 13 and 14 the invention may be applied to the like system of control in connection with changes in humidity of the atmosphere or other meteorological changes and conditions, and the claims are to be read with that understanding. In other words, the terms "thermostatic strip" or "thermostatic bar" are to be understood as the equivalent of or as comprehending a humidostatic strip, and similar devices, according to the particular application of the invention made. If the humidity of the air in the rooms or apartments is to be varied and controlled, the main valve, here represented as a heat-control valve, will control the delivery of moisture instead of heat, and the responsive element will be one responsive to hygrometric changes, and similar adaptations will be made for the control of other atmospheric conditions.

The adjustable stop 23 when moved outward prevents strip 14 from functioning, and leaves the temperature solely under control of strip 13, which will be set or adjusted for whatever temperature it is desired to maintain in the room or space controlled by the instrument A.

What is claimed is:—

1. In a temperature control system of the compressed air type, the combination of a source of air under pressure; a self-opening heat control valve provided with a pneumatic motor for closing it; a secondary valve serving alternately to open communication between the source of air under pressure and said pneumatic motor, and to close such communication and vent the motor; a relay for actuating said secondary valve, having a chamber in communication with the source of air under pressure and provided with a movable wall; a selector for controlling the functioning of said relay, said selector comprising a chamber communicating with the source of air under pressure and having a movable wall and a leak-port for venting the relay chamber; a pad or valve movable toward and from the leak-port to seal and unseal the same; two thermostatic strips, each held at one end and overlying at its free end the pad or valve, said strips adapted and arranged to bend or warp toward, and to press said pad into sealing relation with the leak-port on rise of temperature in the surrounding medium; and means for putting said pad under control of either one of said strips at will.

2. In a temperature control system of the compressed air type, the combination of a source of air under pressure; a self-opening heat control valve provided with a pneumatic motor for closing it; a secondary valve serving alternately to open communication between the source of air under pressure and said pneumatic motor, and to close such communication and vent the motor; a relay for actuating said secondary valve, having a chamber in communication with the source of air under pressure and provided with a movable wall; a selector for controlling the functioning of said relay, said selector comprising a chamber communicating with the source of air under pressure and having a movable wall and a leak-port for venting the relay chamber; a pad or valve movable toward and from the leak-port to seal and unseal the same; two thermostatic strips, each held at one end and overlying at its free end the pad or valve, said strips adapted and arranged to bend or warp toward, and to press said pad into sealing relation with the leak-port on rise of temperature in the surrounding medium; means for setting the respective strips to act upon the pad at relatively different temperatures; and means for putting said pad under control of either one of said strips at will.

3. In a temperature control system of the compressed air type, the combination of a source of air under pressure; a self-opening heat control valve provided with a pneumatic motor for closing it; a secondary valve serving alternately to open communication between the source of air under pressure and said pneumatic motor, and to close such communication and vent the motor; a relay for actuating said secondary valve, having a chamber in communication with the source of air under pressure and provided with a movable wall; a selector for controlling the functioning of said relay, said selector comprising a chamber communicating with the source of air under pressure and having a movable wall and a leak-port for venting the relay chamber; a pad or valve movable toward and from the leak-port to seal and unseal the same; two thermostatic strips, each held at one end and overlying at its free end the pad or valve, said strips adapted and arranged to bend or warp toward and to press said pad into sealing relation with the leak-port on rise of temperature in the surrounding medium; means for setting the respective strips to act upon the pad at relatively different temperatures; and a stop movable into position to arrest inward movement of one of the strips and prevent it from actuating the pad and sealing the leak-port, thereby placing said pad under control of the other strip alone.

4. A temperature control apparatus of the compressed air type, comprising a source of air under pressure; a heat-control valve provided with a pneumatic motor in communication with said source, for moving the heat-control valve in one direction, and automatic means for moving it in the reverse direction when the pneumatic motor is vented; a secondary valve between the source of air under pressure and the pneumatic motor of the heat-control valve, serving alternately to establish and to cut off communication between the motor and the air source and to vent said motor; a second pneumatic motor for actuating the secondary valve, provided with a leak-port; a pad or valve for sealing said leak-port; two thermostatic strips each adapted to warp or bend and move the pad or valve into sealing relation with the leak-port on rise of temperature; means for setting said strips to act upon said valve at relatively different temperatures; and a stop movable into position to limit the movement of one of said strips and prevent it from seating said pad or valve, thus placing the pad or valve solely under control of the other strip.

5. In a temperature control system of the compressed air type, a source of air under pressure and a pipe or conduit for the air; a relay of the character described, communicating with said source and containing a pneumatic motor for actuating the relay; a selector, comprising a base having a leak-port communicating with and serving to vent said relay motor; a pad or valve for sealing said leak port; two thermostatic strips each held at one end and having its opposite end overlying the pad or valve and serving to move the same to sealing position upon rise of temperature and consequent bending of the strip; means for adjusting said strips to act upon the pad or valve at relatively different temperatures; a stop disk having alternate sections of lower and higher elevation, movable to bring either a higher or lower portion into the path of one of said strips; a ratchet-wheel connected with and serving to impart rotation to said disk; a pawl for engaging one after another the teeth of the ratchet wheel to impart a step-by-step rotation thereto and to the disk; a movable frame carrying said pawl; a spring for moving said frame in one direction; an expansible chamber for moving said frame in the opposite direction when said chamber is inflated; and means for alternately causing an abnormal pressure in the air pipe and restoring the normal pressure therein; whereby the frame and pawl are moved back and forth to rotate the ratchet wheel and disk, the higher portions of the disk serving when brought into the path of the strip, to limit its movement and prevent it from acting upon the leak-port pad or valve, and the lower portions of the disk, when brought into the path of the strip, serving to permit said strip to act upon and to seal said pad or valve.

6. In a temperature control system of the compressed air type, having a compressed air pipe or main and a leak-port in the air pipe or system to be sealed upon rise of temperature to a predetermined point; a valve or pad for sealing said port; two independent thermostatic strips each adapted to warp or bend in a direction to move said valve or pad into sealing position on rise of temperature, said strips being adjusted to act upon said pad or valve at relatively different temperatures; a stop having portions of relatively high and relatively low projection, and capable of movement to bring a section of either character into the path of one of said strips; a pneumatic motor for moving said stop to position alternately a high and a low portion in the path of said strip and thereby to restrict its movement in sealing direction or leave it unrestricted, as desired; and means for momentarily venting the air pipe and the stop-adjusting motor, to lower the pressure therein and deflate the motor, and thereafter restoring normal pressure and inflating the motor to effect adjustment of the stop.

7. In a temperature control system of the compressed air type, employing a leak-port the closing of which permits pressure to accumulate or build up in and impart motion to a movable element of the system; a pad or valve for sealing said leak-port; two thermostatic strips each held at one end and overlapping the pad or valve at the opposite end, said strips arranged to move toward said pad or valve on rise of temperature and adjusted to so act upon the pad or valve at relatively different temperatures; a stop in the path of inward movement of one of said strips and adjustable relatively to said strip to permit full pad-closing movement thereof, or to limit the movement of said strip and prevent its action to press the pad or valve into sealing relation to the leak-port; a source of air under pressure; an air main extending from said source to said leak-port; a vent in the air main intermediate the source of air under pressure and said leak-port; and a valve in the air main serving to close communication between said main and the source of compressed air, and to open said vent to the atmosphere and lower the pressure in the main beyond said valve.

8. In a temperature control system of the compressed air type, employing a leak-port the closing of which permits pressure to accumulate or build up in and impart motion to a movable element of the system; a pad or valve for sealing said leak-port; two thermostatic strips each held at one end and overlapping the pad or valve at the opposite end, said strips arranged to move toward said pad or valve on rise of temperature and adjusted to so act upon the pad or valve at relatively different temperatures; a stop in the path of inward movement of one of said strips and adjustable relatively to said strip to permit full pad-closing movement thereof, or to limit the movement of said strip and prevent its action to press the pad or valve into sealing relation to the leak-port; and means for adjusting said stop from a distant point.

9. In a temperature control system of the compressed air type, employing a leak-port the closing of which permits pressure to accumulate or build up in and impart motion to a movable element of the system; a pad or valve for sealing said leak-port; two thermostatic strips each held at one end and overlapping the pad or valve at the opposite end, said strips arranged to move toward said pad or valve on rise of temperature and adjusted to so act upon the pad or valve at relatively different temperatures; a stop in the path of inward movement of one of said strips and adjustable relatively to said strip to permit full pad-closing movement thereof, or to limit the movement of said strip and prevent its action to press the pad or valve into sealing relation to the leak-port; and means operable by producing alternately an abnormal and a normal pressure in the air pipe or main, for so adjusting said stop.

10. In a temperature control system of the compressed air type, employing a leak-port the closing of which permits pressure to accumulate or build up in and impart motion to a movable element of the system; a pad or valve for sealing said leak-port; two thermostatic strips each held at one end and overlapping the pad or valve at the opposite end, said strips arranged to move toward said pad or valve on a rise of temperature and adjusted to so act upon the pad or valve at relatively different temperatures; a stop in the path of inward movement of one of said strips and adjustable relatively to said strip to permit full pad-closing movement thereof, or to limit the movement of said strip and prevent its action to press the pad or valve into sealing relation to the leak-port; means operable by producing alternately an abnormal and a normal pressure in the air pipe or main, for so adjusting said stop; and a second stop manually adjustable in the path of movement of the selected strip to prevent or permit, as desired, the automatic control of the first-mentioned stop.

11. In a temperature control system of the compressed air type, a selector of the character described, comprising two independent thermostatic strips and a valve or pad closable thereby to seal or vent a leak-port in the air system; a stop adjustable into arresting or non-arresting position of one of said strips; mechanism for positioning said stop through alternate lowering and restoration to normal of the pressure in the air pipe of the system; and a valve in said air pipe serving alternately to cut off the supply of air to said pipe and to vent the pipe, and to close the vent and reconnect the air pipe with the source of supply.

12. In a temperature control system of the compressed air type, comprising a source of compressed air, an air conduit and a leak-port therefor; two thermostatic strips serving independently to seal said leak-port at one or another temperature; a stop adjustable in the path of closing movement of one of said strips, to limit the inward movement of said strip and prevent its closing of the leak-port, or to permit such closing, as required; a vent in the air main between the source of compressed air and the leak-port; and a valve in the air main serving to close communication between said main and the source of compressed air, and to open said vent to the atmosphere and lower the pressure in the main beyond said valve.

13. In a temperature control system of the compressed air type, employing two independently-acting thermostatic strips, a stop comprising a threaded stem entering a threaded socket and carrying a disk bearing suitable symbols; and a shield or guard in front of said disk and having a window or opening through which one or another symbol may be displayed as said disk and stem are rotated, said stem having its outer end arranged in the path of one of the thermostatic strips and adapted, as one or the other of its symbols is displayed through the opening in the guard, to limit the inward warping of one of said strips or to permit full movement thereof, as desired.

14. In a temperature control system of the compressed air type, comprising a source of compressed air, an air main and a nipple having a leak-port; a pad or valve for sealing said leak-port; two independent members responsive to meteorological changes, and each movable toward the pad or valve to cause it to seal the leak-port, each member capable of initial adjustment to act upon said pad or valve at different stages or degrees of change in given atmospheric conditions; means for holding one of said members out of port-sealing action; a vent in the air main between the source of compressed air and the leak-port; and a valve in the air main serving to close communication between said main and the source of compressed air, and to open said vent to the atmosphere and lower the pressure in the main beyond said valve.

15. In combination with a control system of the compressed-air type, comprising automatic means for closing and opening a main supply valve or damper, two independent members each responsive to atmospheric changes of like character, and each capable of independent initial adjustment, said members being common to and serving to actuate said valve-opening and closing means at different degrees in the scale employed; and pneumatic means controllable from a remote point, for putting one of said members into and out of action at will.

16. In combination with a control system of the compressed-air type, comprising automatic means for closing and opening a main heat supply valve or damper, two independent members each responsive to temperature changes, and each capable of independent initial adjustment, said members being common to and serving to actuate said valve opening and closing means at relatively different temperatures; and pneumatic means controllable from a remote point, for putting one of said members into and out of action at will.

In testimony whereof I have signed my name to this specification.

CHARLES L. FORTIER.